United States Patent
Klutts

(10) Patent No.: US 7,159,625 B1
(45) Date of Patent: Jan. 9, 2007

(54) DEVICE FOR VERIFYING AMOUNT OF DISPENSED GASOLINE AND METHOD OF USE

(76) Inventor: David Klutts, 3383 Pavlo St., Las Vegas, NV (US) 89121

( * ) Notice: Subject to any disclaimer, the term of this patent is extended or adjusted under 35 U.S.C. 154(b) by 0 days.

(21) Appl. No.: 11/138,963

(22) Filed: May 25, 2005

(51) Int. Cl.
*B65B 1/04* (2006.01)

(52) U.S. Cl. .................. 141/95; 141/83; 141/94; 222/71

(58) Field of Classification Search .......... 141/83, 141/59, 94, 95, 198, 350, 349; 220/86.2; 222/71

See application file for complete search history.

(56) References Cited

U.S. PATENT DOCUMENTS

| | | | |
|---|---|---|---|
| 2,955,725 A | | 10/1960 | Niederst |
| 3,805,997 A | | 4/1974 | Csabafy et al. |
| 3,810,562 A | | 5/1974 | Clarke |
| 4,138,880 A | * | 2/1979 | Cohen et al. ........... 73/31.07 |
| 4,548,084 A | | 10/1985 | Onoda et al. |
| 5,091,612 A | | 2/1992 | Van Fossen |
| 5,316,057 A | | 5/1994 | Hasselmann |
| 5,437,183 A | * | 8/1995 | Janssen et al. ........... 73/201 |
| 5,479,966 A | | 1/1996 | Tison et al. |
| 5,871,651 A | * | 2/1999 | McSpadden ........... 210/739 |
| 6,151,955 A | * | 11/2000 | Ostrowski et al. ........ 73/40 |
| 6,341,629 B1 | | 1/2002 | Clark et al. |
| 2005/0028609 A1 | | 2/2005 | Langemann et al. |

FOREIGN PATENT DOCUMENTS

EP  726510 A2  8/1996

* cited by examiner

*Primary Examiner*—Steven O. Douglas
(74) *Attorney, Agent, or Firm*—Rob L. Phillips; Greenberg Traurig

(57) ABSTRACT

A device for verifying the amount of gasoline dispended by a gasoline pump is disclosed. The device comprises a housing containing a flow meter with said housing adapted to receive a gas pump nozzle and having an exit nozzle which is received by an intake gasoline channel of an automotive vehicle. In this manner, the housing and corresponding flow meter is integrated between the gas pump nozzle and gasoline-receiving channel of the vehicle. A display on the flow meter housing records the amount of gasoline dispensed therethrough. A user is then able to compare the recorded amount on the flow meter display with the amount recorded on a gas pump display. In an alternative version, a flow meter is incorporated within the gasoline-receiving channel of a vehicle. An automotive display then displays the volume of gasoline pumped into the vehicle for comparison with the volume displayed on the gas pump display.

15 Claims, 2 Drawing Sheets

DEVICE FOR VERIFYING AMOUNT OF DISPENSED GASOLINE AND METHOD OF USE

FIELD OF THE INVENTION

The embodiments of the present invention relate to a device for verifying the volume of gasoline dispensed from a commercial gas pump into a vehicle. A device reading is compared to a gas pump reading to verify the gas pump reading is accurate.

BACKGROUND

Because of the strong demand for oil, gas prices at the pumps are at all time highs. As demand continues to increase and oil reserves are depleted, gas prices will undoubtedly increase even further. To date, consumers of gasoline purchase their gasoline at commercial gas stations and have relied on the apparent accuracy of gas pump meter readings to determine the amount of gasoline dispensed by the gas pump. While different states use different agencies (e.g., Department of Weights and Measures) to routinely inspect gas pumps and their accuracy, there remain ample opportunities for gas pumps to inaccurately dispense gasoline.

Unfortunately, inaccurate meter settings and/or calibration may result in consumers paying more per gallon than advertised. Also, unscrupulous gas station owners may intentionally manipulate the meter settings to defraud consumers. With current gas prices, even a small inaccuracy or manipulation results in a significant and unnecessary loss for the consumer.

To prevent such inaccuracies and calibration errors, there is the need for a device and method for verifying the volume of gasoline dispensed by commercial gas pumps.

SUMMARY

Accordingly, a first embodiment of the present invention comprises a housing, containing a meter, wherein said housing is adapted to cooperate with a gas pump nozzle. The meter measures the volume of gasoline dispensed. The volume is then displayed on a housing display for the user. Once a consumer completes the gasoline dispensing process, he or she is able to verify the accuracy of the gas pump display reading with the display reading of the hand-held meter housing.

A second embodiment of the present invention comprises a meter integrated into a gasoline-receiving channel of a vehicle. The meter communicates with a vehicle processor and/or vehicle display to provide the vehicle owner with an accurate reading of the volume of gasoline pumped into the vehicle. The vehicle display reading may then be compared to the gas pump display reading to determine whether there is correspondence.

Other advantages, objects, variations and embodiments of the present invention will be readily apparent from the following drawings, detailed description, abstract and claims.

DETAILED DESCRIPTION

Figure 1:
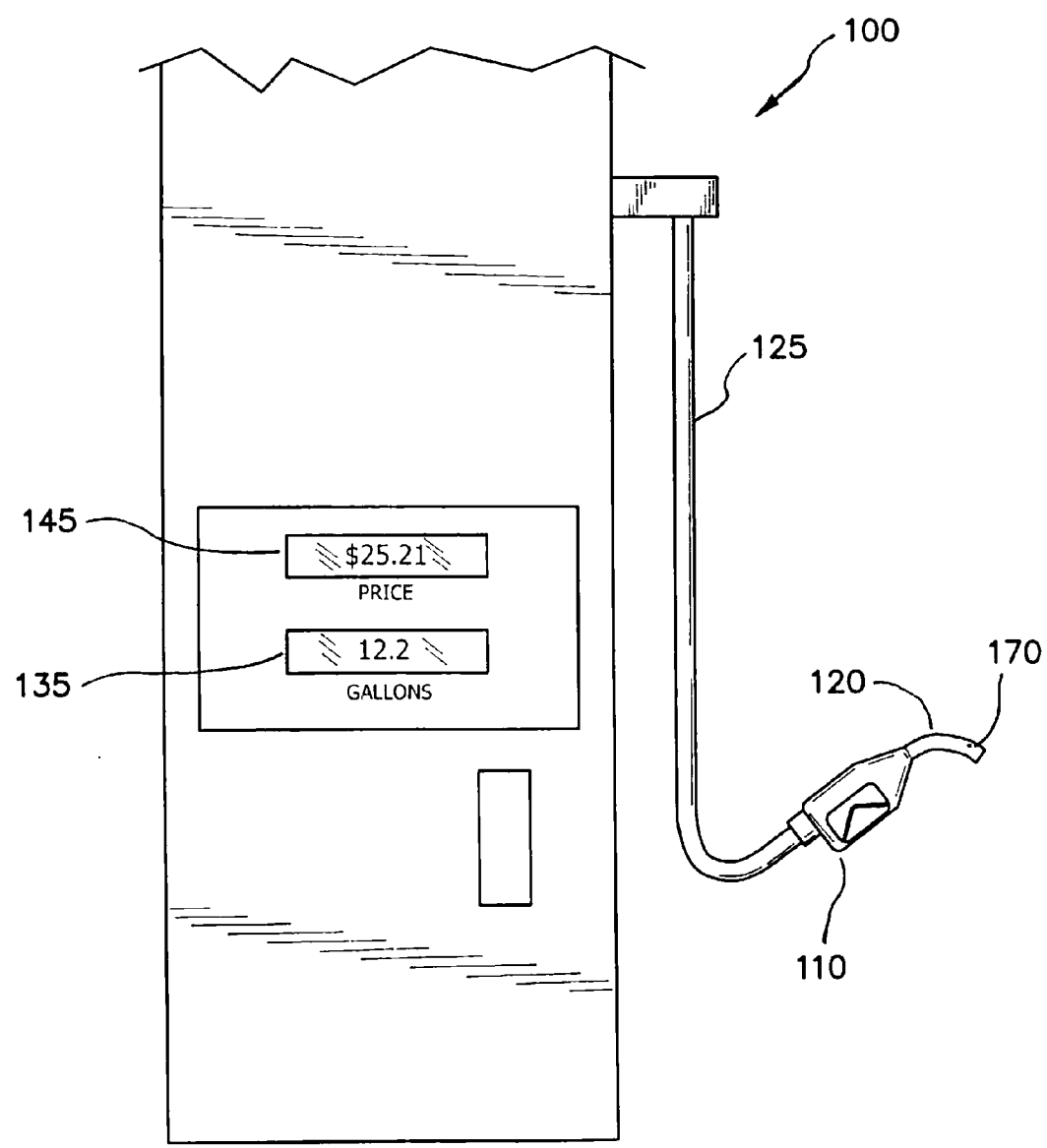
FIG. 1 shows a conventional gas pump.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Reference is now made to the figures wherein like parts are referred to by like numerals throughout. FIG. 1 shows a conventional gas pump 100, having a gas pump handle 110 and nozzle 120. The gas pump handle 110 is connected to the gas pump 100 via hose 125. Gas pump displays 135, 145 record the gallons of gasoline pumped and the corresponding price, respectively.

Figure 2:
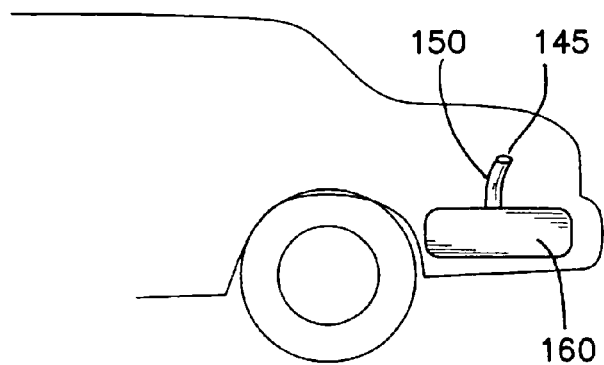
FIG. 2 shows a vehicle gas tank and gas-receiving channel.

Now referring to FIG. 2, the gas pump nozzle 120 includes automatic shut-off means such that gasoline does not overflow or spill from a vehicle's gas intake opening 145 or gasoline-receiving channel 150. That is, once a vehicle's gas tank 160 is full and gasoline begins to fill the vehicle's gasoline-receiving channel 150, the automatic shut-off means causes the gas pump 100 to cease dispensing gasoline. The nozzle 120 uses hidden components to shut off when the gas tank 160 is full. When a small hole 170 located near an open end of the nozzle 120 is blocked by gasoline, an automatic shut-off valve is triggered. A thin tube (not shown) inside the hose 125 operates the valve system. The tube extends from the hole 170 to a vacuum pump (not shown) inside the gas pump 100. As gasoline is dispensed into a partially filled gas tank, air is permitted to flow easily into the nozzle hole 170 thereby maintaining the pressure inside the thin tube at near atmospheric pressure. When the level of gasoline is such that it blocks the hole 170, the pressure inside the tube drops. The pressure drop triggers the valve and stops the flow of gasoline.

Figure 3:
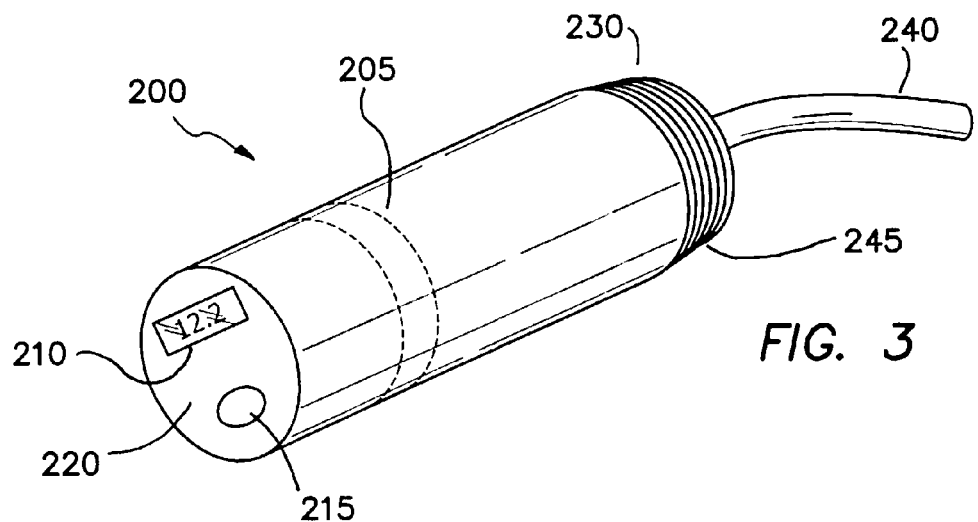
FIG. 3 shows a first embodiment of a meter of the present invention wherein the device is integrated between a gas pump nozzle and gasoline-receiving channel of a vehicle.

FIG. 3 shows housing 200 containing a flow meter 205. The housing further includes a display 210 in communication with said flow meter 205. A first end 220 of the housing 200 is adapted to receive the gas pump nozzle 120. A hinged or spring-biased flap 215 allows the gas pump nozzle 120 to be inserted, at least partially, into the housing 200. A second end 230 of the housing 200 includes a nozzle 240 adapted to insert into the vehicle's gasoline-receiving channel 150. The nozzle 240 is generally identical to the gas pump nozzle 120. A base 245 of the nozzle 240 threadably engages the second end 230 of the housing 200. During non-use, the base 245 of the nozzle 240 is unscrewed from connection with the housing 200 and re-connected with the nozzle 240 contained within the body 205 of the housing 200. To accomplish this, both ends of the base 245 are threaded to permit the base 245 to connect in either direction with the housing 200. This design provides for easy storage of the housing 200 and prevents, along with the flap 215, any gasoline from leaking from the meter housing during non-use.

In one embodiment, the automatic shut-off valve of the gas pump 100 is triggered when the gasoline in the housing 200 reaches an adequate level to cover the hole 170. Ideally, the housing 205 is small to ensure that when the automatic shut-off valve triggers, the gasoline remaining in the housing 205 is able to flow into the gasoline-receiving channel of the vehicle without overflowing. A small housing also facilitates easy storage and handling by users.

The meter 205 can be fashioned like any conventional flow meter designed to accurately measure or calculate the amount of liquid flowing therethrough. The accuracy of the flow meter 205 should be sufficient to justify the purpose of the device described herein. In other words, the flow meter 205 should be as accurate as a properly calibrated gas pump flow meter. Most liquid flow meters determine a flow rate by inferentially measuring the liquid's velocity or change in kinetic energy. Since the velocity, cross-section of the subject passageway and time of flow are known, the amount of liquid passing therethrough can be calculated. The volume is calculated using the formula (Volume=V×A×T) where V is the velocity of the liquid, A is the cross-sectional area of the liquid passageway and T is the amount of time during which the liquid flows. Indeed, the meter 205 may be very much like an internal flow meter of the gas pump 100. However, the meter 205 is calibrated by the user and known to be accurate as opposed to the internal meter of the gas pump 100.

Based on the proximity of the housing 200 to the gasoline and corresponding vapors, the meter 205 and display 210 are preferably mechanical. However, the meter 205 and/or display 210 may be digital provided that critical electrical components and connections are properly insulated. In a digital embodiment, a power source is integrated into the housing 200. The power source may consist of batteries, solar power and the like.

Figure 4:
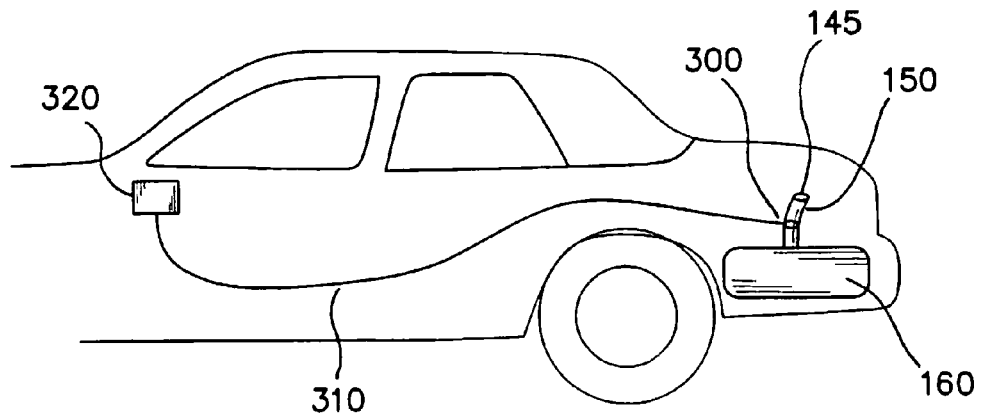
FIG. 4 shows a second embodiment of the present invention wherein a meter is integrated in a gasoline-receiving channel of a vehicle.

FIG. 4 shows a second embodiment of the present invention wherein a flow meter 300 is integrated into the gasoline-receiving channel 150 within the vehicle. Other devices, including sensors, may be used in place of the flow meter 300 to measure the amount of gasoline being pumped in to the automotive vehicle. In this embodiment, the meter 300 communicates, via wire 310, with a vehicle display 320. Today's vehicles include one or more electronic dashboard displays and/or hierarchical display units for providing drivers with current diagnostic information (e.g., oil level) regarding the vehicle. Accordingly, with this embodiment of the present invention, the driver is able to confirm the amount of gasoline dispensed by comparing the volume displayed on the gas pump display to the volume displayed on a vehicle's display. This embodiment may be manufactured with the vehicle or may be installed as an aftermarket type product.

It will be understood by those skilled in the art that any type of flow meter may be used to measure the volume of gasoline dispensed or pumped by the gas pump.

Although the invention has been described in detail with reference to several embodiments, additional variations and modifications exist within the scope and spirit of the invention as described and defined in the following claims.

I claim:

1. A device for verifying an amount of gasoline dispensed by a gasoline pump comprising:

a housing incorporating means for measuring gasoline flow, said housing adapted to receive a gas pump nozzle, said gas pump nozzle received by a first end of the housing;

an exit nozzle extending from a second end of the housing, said exit nozzle adapted to be received by a gasoline-receiving channel of an automotive vehicle; and a display integrated on said housing and in communication with said means for measuring gasoline flow, said display for displaying an amount of gasoline dispensed by the gas pump and through the housing.

2. The device of claim 1 wherein the means for measuring the gasoline flow is a volumetric flow meter.

3. The device of claim 1 wherein the first end of the housing includes a hinged flap covering an opening, said opening for receiving the gas pump nozzle.

4. The device of claim 1 wherein the first end of the housing includes a spring-biased flap covering an opening, said opening for receiving the gas pump nozzle.

5. The device of claim 1 wherein the exit nozzle is removably connected to the housing.

6. The device of claim 1 wherein the meter and/or display is mechanical.

7. The device of claim 1 wherein the meter and/or display is digital.

8. A device for verifying an amount of gasoline dispensed by a gasoline pump comprising:

a housing incorporating means for measuring gasoline flow, a first end of said housing including an opening for receiving a gas pump nozzle;

an exit nozzle removably connected to a second end of the housing, said exit nozzle adapted to be received by a gasoline-receiving channel of an automotive vehicle; and a display integrated on said housing and in communication with said means for measuring gasoline flow, said display for displaying an amount of gasoline dispensed by the gas pump and through the housing.

9. The device of claim 8 wherein the meter is mechanical.

10. The device of claim 8 wherein the meter is digital.

11. The device of claim 8 further comprising a moveable flap covering the opening for receiving the gas pump nozzle.

12. A method for verifying an amount of gasoline dispensed by a gasoline pump comprising:

inserting a gas pump nozzle into an opening of a flow meter housing wherein said opening is adapted to receive said gas pump nozzle;

inserting an exit nozzle of said flow meter housing into a gasoline-receiving intake channel of an automotive vehicle;

dispensing gasoline in a conventional manner; and comparing an amount of dispensed gasoline recorded by a flow meter display to an amount of dispensed gasoline recorded by a gas pump display.

13. A system for verifying an amount of gasoline dispensed by a gasoline pump comprising:

a flow meter integrated in a gasoline-receiving channel of an automotive vehicle, said flow meter for measuring an amount of gasoline pumped into said automotive vehicle; and a vehicle display in communication with said flow meter, said display for displaying the amount of gasoline pumped into said automotive vehicle.

14. A method for verifying an amount of gasoline dispensed by a gasoline pump comprising:

measuring an amount of gasoline pumped into a gasoline-receiving channel of an automotive vehicle;

displaying the measured amount of gasoline pumped into the gasoline-receiving channel; and displaying the measured amount of gasoline pumped into the gasoline-receiving channel on a vehicle display.

15. The method of claim 14 further comprising a flow meter for measuring the amount of gasoline pumped into the gasoline-receiving channel.

\* \* \* \* \*